United States Patent
Iskandar et al.

(10) Patent No.: US 11,126,172 B2
(45) Date of Patent: Sep. 21, 2021

(54) METHODS AND SYSTEMS FOR APPLYING RUN-TO-RUN CONTROL AND VIRTUAL METROLOGY TO REDUCE EQUIPMENT RECOVERY TIME

(71) Applicant: Applied Materials, Inc., Santa Clara, CA (US)

(72) Inventors: Jimmy Iskandar, Fremont, CA (US); Jianping Zou, Austin, TX (US); Parris C. M. Hawkins, Los Altos, CA (US); James Moyne, Canton, MI (US)

(73) Assignee: Applied Materials, Inc., Santa Clara, CA (US)

( * ) Notice: Subject to any disclaimer, the term of this patent is extended or adjusted under 35 U.S.C. 154(b) by 63 days.

(21) Appl. No.: 16/538,689

(22) Filed: Aug. 12, 2019

(65) Prior Publication Data
US 2020/0004234 A1    Jan. 2, 2020

Related U.S. Application Data

(63) Continuation of application No. 14/716,838, filed on May 19, 2015, now abandoned.

(51) Int. Cl.
    *G05B 23/02*    (2006.01)
(52) U.S. Cl.
    CPC ....... *G05B 23/0294* (2013.01); *G05B 23/024* (2013.01)
(58) Field of Classification Search
    None
    See application file for complete search history.

(56) References Cited

U.S. PATENT DOCUMENTS

| 2001/0037761 A1 | 11/2001 | Ries et al. |
| 2004/0093107 A1 | 5/2004 | Good et al. |
| 2009/0228129 A1 | 9/2009 | Moyne et al. |

(Continued)

OTHER PUBLICATIONS

Khan et al., "An Approach for Factory-Wide Control Utilizing Virtual Metrology", IEEE Transactions on Semiconductor Manufacturing, vol. 20, No. 4, Nov. 2007.

(Continued)

*Primary Examiner* — Mohammad Ali
*Assistant Examiner* — Saad M Kabir
(74) *Attorney, Agent, or Firm* — Patterson + Sheridan, LLP

(57) ABSTRACT

Described herein are methods, apparatuses, and systems for reducing equipment repair time. In one embodiment, a computer implemented method includes collecting test substrate data or other metrology data and fault detection data for maintenance recovery of at least one manufacturing tool in a manufacturing facility and determining a relationship between tool parameter settings for the manufacturing tool and the test substrate data. The method further includes utilizing virtual metrology predictive algorithms and at least some collected data to obtain a metrology prediction and applying multivariate run-to-run (R2R) control modeling to obtain a state estimation including a current operating region of the at least one manufacturing tool. Applying multivariate run-to-run (R2R) control modeling to obtain tool parameter adjustments for at least one manufacturing tool to reduce maintenance recovery time and to reduce requalification time.

9 Claims, 8 Drawing Sheets

(56) References Cited

U.S. PATENT DOCUMENTS

| | | |
|---|---|---|
| 2011/0202160 A1 | 8/2011 | Moyne |
| 2012/0130525 A1 | 5/2012 | Tsai et al. |
| 2013/0151447 A1* | 6/2013 | Kaushal ............. G05B 13/0265 |
| | | 706/12 |
| 2014/0207271 A1 | 7/2014 | Tsai et al. |

OTHER PUBLICATIONS

Aftab A. Khan; J. R. Moyne; D. M. Tilbury, "Virtual metrology and feedback control for semiconductor manufacturing processes using recursive partial least squares" Journal of Process Control, ISSN: 0959-1524, vol. 18, Issue: 10, p. 961-974 (Year: 2008).

Moyne, James, et al., "Chamber Matching Across Multiple Dimensions—Utilizing Predictive Maintenance, Equipment Health Monitoring, Virtual Metrology and Run-to-Run Control", Applied Materials—Applied Global Services, Santa Clara, CA, May 19, 2014, 6 pages.

Yedatore, Manjunath, et al., "Improving Yield with Fleet Chamber Matching", Nanochip Fab Solutions VB/Issue Feb. 2013 Dec. 2013 pp. 24-27.

\* cited by examiner

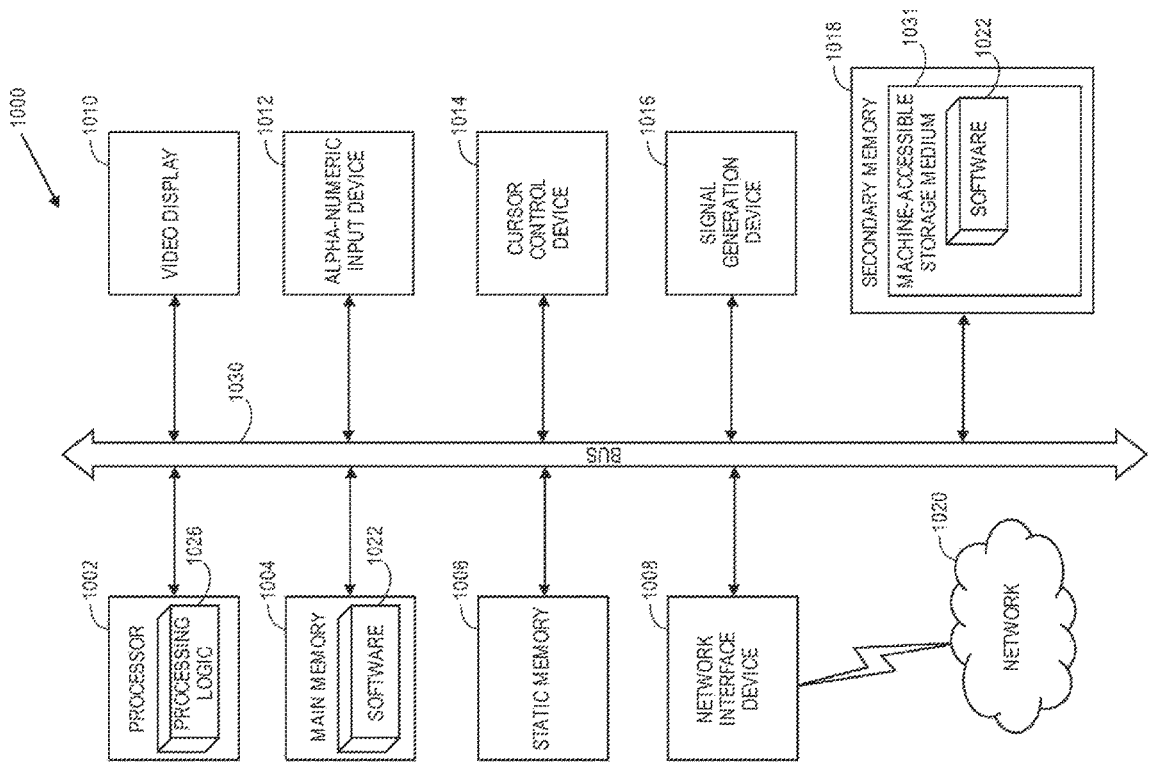

METHODS AND SYSTEMS FOR APPLYING RUN-TO-RUN CONTROL AND VIRTUAL METROLOGY TO REDUCE EQUIPMENT RECOVERY TIME

CROSS-REFERENCE TO RELATED APPLICATIONS

This Application is a Continuation of application Ser. No. 14/716,838 filed on May 19, 2015, which is herein incorporated by reference in its entirety.

TECHNICAL FIELD

Embodiments of the present invention relate to methods and systems for applying run-to-run control and virtual metrology to reduce equipment recovery time including mean-time-to-repair (MTTR) for equipment and components.

BACKGROUND

In manufacturing there are a number of processes where maintenance is a requirement either at specific intervals or in response to an event such as a broken component or low quality production. Following the maintenance there is often a process that is executed whereby the equipment is "requalified" to a certain state such as "ready to return to production". This requalification can be a long and iterative process whereby process and equipment parameters are adjusted or "tuned". After a tuning iteration the equipment is evaluated, e.g., by producing a test product and then measuring the quality of the test product. If the evaluation indicates that the equipment or process has not met certain criteria another tuning iteration is conducted. This iterative process is often manual, and even if partially automated, is often addressed in a univariate adhoc fashion where a few of the total set of parameters are tuned at each iteration. The time taken for these tuning iterations is considered to be part of the mean-time-to-repair (MTTR) for the equipment.

SUMMARY

Described herein are methods, apparatuses, and systems for reducing equipment repair time. In one embodiment, a computer implemented method includes collecting, with a system, data including test substrate data or other metrology data and fault detection data for maintenance recovery of at least one manufacturing tool in a manufacturing facility and determining, with the system, a relationship between tool parameter settings for the at least one manufacturing tool and at least some collected data including the test substrate data. The method further includes utilizing zero or more virtual metrology predictive algorithms and at least some collected data to obtain a metrology prediction and applying multivariate run-to-run (R2R) control modeling to obtain a state estimation including a current operating region of the at least one manufacturing tool based on the test substrate data and obtain at least one tool parameter adjustment for at least one target parameter for the at least one manufacturing tool. Applying multivariate run-to-run (R2R) control modeling to obtain tool parameter adjustments for at least one manufacturing tool occurs after maintenance to reduce maintenance recovery time and to reduce requalification time.

In another embodiment, a computer system includes a memory to store one or more sets of instructions and a processor that is coupled to the memory. The processor is configured to execute instructions to collect data including test substrate data or metrology data and fault detection data for maintenance recovery of at least one manufacturing tool in a manufacturing facility, determine a relationship between tool parameter settings for the at least one manufacturing tool and at least some collected data including the test substrate data. The method further includes utilizing zero or more virtual metrology predictive algorithms and at least some collected data to obtain a metrology prediction and applying multivariate run-to-run (R2R) control modeling to obtain a state estimation including a current operating region of the at least one manufacturing tool based on the test substrate data and obtain at least one tool parameter adjustment for at least one target parameter for the at least one manufacturing tool.

BRIEF DESCRIPTION OF THE DRAWINGS

The present invention is illustrated by way of example, and not by way of limitation, in the figures of the accompanying drawings and in which:

FIG. 10 illustrates a block diagram of an exemplary computer system, in accordance with one embodiment of the present invention.

DETAILED DESCRIPTION

Described herein are methods, apparatuses, and systems for multivariate analysis utilizing run-to-run control and virtual metrology to reduce MTTR during post preventative maintenance (PM) recovery. In some embodiments, systems and methods for reducing the time for tuning iterations (e.g., by reducing the needed number of iterations) results in reduced MTTR and reduced green-to-green (G2G) time (i.e., the time between production-worthy states). Embodiments of this invention reduce the MTTR and G2G time by reducing the number of tuning iterations required to bring an equipment or manufacturing tool to a specified state after a maintenance or other non-production event. The methods and systems of the present disclosure leverage capabilities that include "run-to-run" (R2R) control and virtual metrology (VM).

Figure 1:
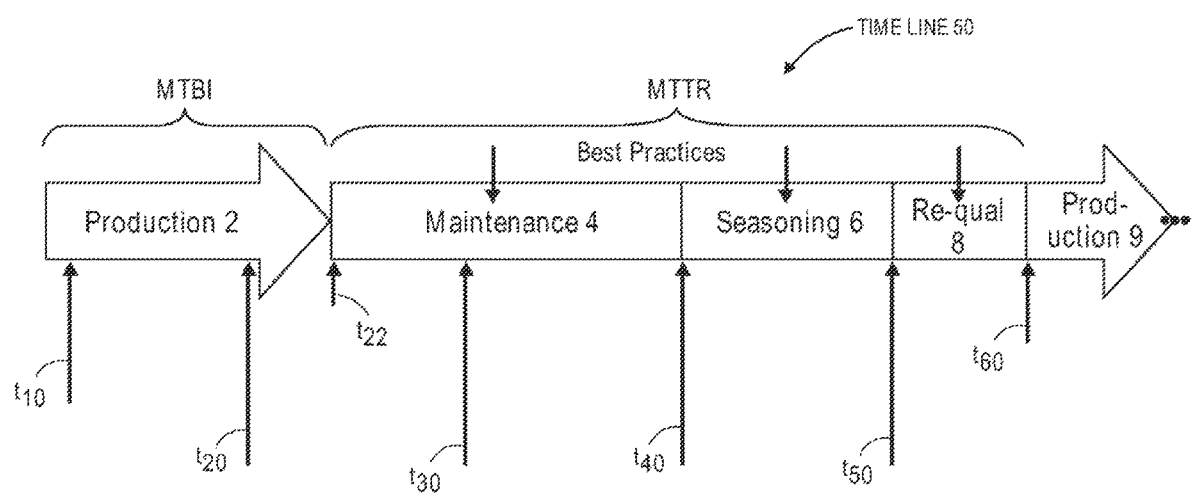
FIG. 1 is a time line of a maintenance recovery process in accordance with one embodiment.

Following maintenance there is often a process that is executed in which the equipment is "requalified" to a certain state such as a ready to return to production state. FIG. 1 is a time line of a maintenance recovery process in accordance with one embodiment. There are a number of techniques that can be used during the production cycle (from producing wafers during production state 2, through predicting and scheduling maintenance state 4, seasoning state 6, requalification state 8 and returning to a production state 9 after a maintenance event) that can improve production capabilities. MTBI is defined as mean-time-between-interrupts for a production state 2. Many of these techniques are components or extensions of existing Advanced Process Control (APC) systems capabilities and can therefore leverage the data management environment provided by an existing manufacturing system's APC infrastructure. The specific capabilities of the solution, their definitions, and example of their manner of utilization are described as follows.

Fault Detection (FD) is the technique of monitoring and analyzing variations in tool and/or process data to detect anomalies. Fault detection includes both univariate and multivariate statistical analysis techniques. FD analysis is often used to identify excursions. Also FD analysis output feed EHM, PdM and VM solutions (see below).

Equipment Health Monitoring (EHM) is the technology of monitoring tool parameters to assess the tool health as a function of deviation from normal behavior. EHM is not necessarily predictive in nature, but is often a component of predictive systems. EHM can be used during production (e.g., $t_{10}$) to monitor tool health and during the maintenance recovery process to assess "fingerprints" indicating successful maintenance procedures (e.g., $t_{40}$), ready to move to requalification (e.g., $t_{50}$) or during requalification (e.g., $t_{60}$) to help determine if a component is ready to return to a production state (e.g., maintenance success verification).

Predictive Maintenance (PdM) is the technology of utilizing process and equipment state information to predict when a tool or a particular component in a tool might need maintenance, and then utilizing this prediction as information to improve maintenance procedures. This could mean predicting and avoiding unplanned downtimes and/or relaxing un-planned downtime schedules by replacing schedules with predictions. PdM solutions (e.g., PdM at $t_{22}$) have been illustrated to provide a number of benefits including reduction of unscheduled downtime.

Run-to-Run (R2R) control is the technique of modifying recipe or other equipment parameters, or the selection of control parameters between runs to improve processing performance. A "run" can be a batch, lot, or an individual substrate, wafer, or other product. R2R control (e.g., $t_{20}$) is typically used during production to improve processes through improved closeness to quality targets and reduce variability of quality parameters. R2R control (e.g., $t_{30}$) can also be used during a maintenance state to determine maintenance settings or process adjustments.

Virtual Metrology (VM) is the technology of prediction of post process metrology variables (e.g., either measurable or nonmeasurable) using process and wafer state information that could include upstream metrology and/or sensor data. Typical uses of VM are to enhance the R2R control capabilities (e.g., $t_{10}$, $t_{30}$) and reduce average production cycle time by reducing the need for metrology. Best practices and domain knowledge are procedures that leverage understanding of or experience with the equipment and process and related components to improve capabilities throughout the production cycle.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. Unless specifically stated otherwise, as apparent from the following discussion, it is appreciated that throughout the description, discussions utilizing terms such as "collecting", "predicting", "performing", "adjusting", "comparing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine (e.g., a computer) readable storage medium includes read only memory ("ROM"), random access memory ("RAM"), magnetic disk storage media, optical storage media, flash memory devices, etc.

Figure 2:
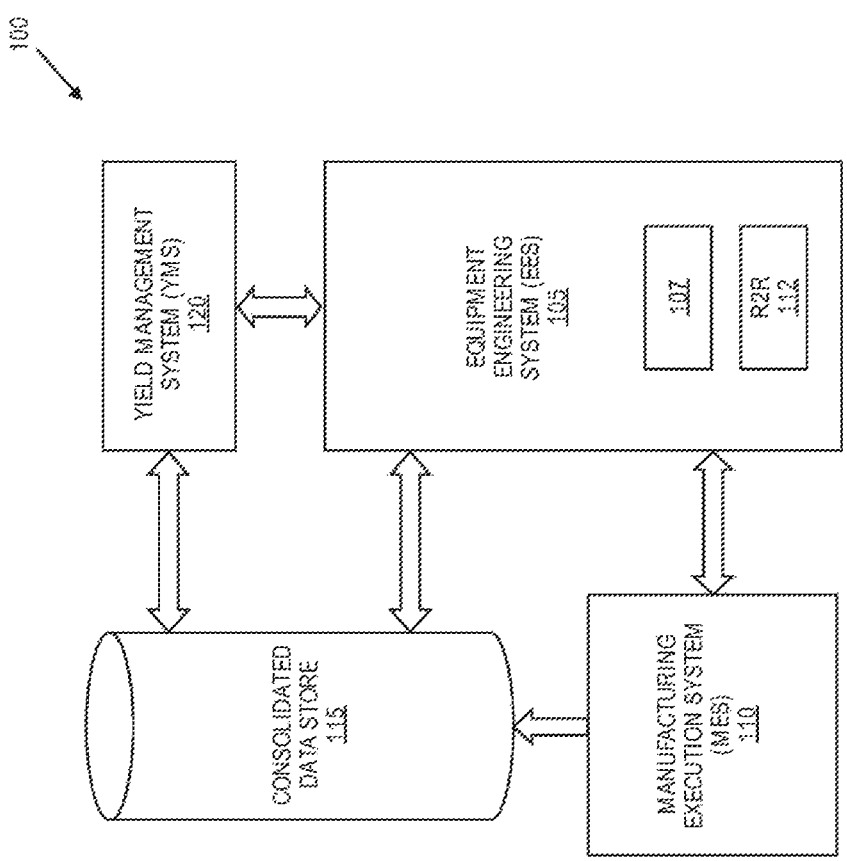
FIG. 2 illustrates an exemplary architecture of a manufacturing environment 100 for reducing maintenance time (e.g., MTTR) in accordance with one embodiment.

FIG. 2 illustrates an exemplary architecture of a manufacturing environment 100 for reducing maintenance time (e.g., MTTR), in accordance with one embodiment. The manufacturing environment 100 may be a semiconductor manufacturing environment, an automotive manufacturing environment, aerospace equipment manufacturing environment, medical equipment manufacturing environment, display and solar manufacturing environment, etc. In one embodiment, the manufacturing environment 100 includes an equipment engineering system (EES) 105, a VM multi-algorithm predictive subsystem 107 within the EES system 105 or some other system coupled to the EES via a network, a manufacturing execution system (MES) 110, a yield management system (YMS) 120 and a consolidated data store 115. The EES 105, MES 110, YMS 120 and consolidated data store 115 may be connected via a network (not shown), such as a public network (e.g., Internet), a private network (e.g., Ethernet or a local area Network (LAN)), or a combination thereof.

The manufacturing execution system (MES) 110 is a system that can be used to measure and control production activities in a manufacturing environment. The MES 110 may control some production activities (e.g., critical production activities) or all production activities of a set of manufacturing equipment (e.g., all photolithography equipment in a semiconductor fabrication facility), of a manufacturing facility (e.g., an automobile production plant), of an entire company, etc. The MES 110 may include manual and computerized off-line and/or on-line transaction processing systems. Such systems may include manufacturing machines, metrology devices, client computing devices, server computing devices, databases, etc. that may perform functions related to processing.

In one embodiment, the MES 110 is connected with a consolidated data store 115. The consolidated data store 115 may include databases, file systems, or other arrangements of data on nonvolatile memory (e.g., hard disk drives, tape drives, optical drives, etc.), volatile memory (e.g., random access memory (RAM)), or combination thereof. In one embodiment, the consolidated data store 115 includes data from multiple data stores (e.g., a YMS data store, a maintenance data store, a metrology data store, process data stores, etc.) that are interconnected. The consolidated data store 115 may store, for example, historical process information of manufacturing recipes (e.g., temperatures, pressures, chemicals used, process times, etc.), equipment maintenance histories, inventories, etc. The consolidated data store 115 may also store data generated by the MES 110, YMS 120 and/or EES 105. For example, the EES 105 may store fault detection and characterization data in the consolidated data store 115, the YMS 120 may store yield analysis data in the consolidated data store 115, and the MES 110 may store historical process information in the consolidated data store 115. This permits each of the YMS 120, EES 105 and MES 110 to leverage data generated by the other systems. The consolidated data store 115 may reside on one or more computing devices hosting any of the MES 110, the YMS 120 and EES 105, or on one or more different computing devices.

The EES 105 is a system that manages some or all operations of a manufacturing environment (e.g., factory). The EES 105 may include manual and computerized off-line and/or on-line transaction processing systems that may include client computing devices, server computing devices, databases, etc. that may perform the functions of equipment tracking, dispatching (e.g., determining what material goes to what processes), product genealogy, labor tracking (e.g., personnel scheduling), inventory management, costing, electronic signature capture, defect and resolution monitoring, key performance indicator monitoring and alarming, maintenance scheduling, and so on.

The EES 105 draws inferences from, reports out, and/or acts upon the combined information that is collected and stored in the consolidated data store 115 and/or the metrology data and process data that is reported by the MES 110. For example, EES 105 can act as an early warning system (e.g., predict scrap, initiate product rework, etc.), provide bottleneck analysis, provide asset management (e.g., reduce unscheduled equipment downtime, reduce scheduled equipment downtime, reduce MTTR), improve lean practices, etc. The EES 105 can be used to gain an understanding of the manufacturing environment 100, and can enable a user to determine an efficiency of the manufacturing environment 100 and/or how to improve all or components of the manufacturing environment 100. In one embodiment, the EES 105 includes components (e.g., VM multi-algorithm predictive subsystem 107 having VM module with prediction algorithm switching module, multivariate R2R controller 112, etc.) that enable the EES 105 to utilize and determine predictive algorithms for adaptive virtual metrology, perform R2R control, reduce MTTR, and reduce green-to-green (G2G) time, which is a time period between production production-worthy states.

The yield management system (YMS) 120 analyzes end-of-line data such as electronic test (e-test) data to determine product yield. The end-of-line data may include wafer acceptance testing (WAT), wafer sort results and/or final test operations. The yield manager 120 can provide product yield trends, lot level analysis of product yield, yield correlation to manufacturing processes, statistical analysis of yield, etc. In one embodiment, the YMS 120 uses integrated circuit design, visible defect, parametric and e-test data to identify causes of low yield.

In one example, with many maintenance events in semiconductor manufacturing, process "tuning" is required as part of the maintenance recovery process, where test wafers are processed and measured and the process is adjusted based on the results. The process is determined ready-for-production when the test wafer measurements meet specified quality criteria. This tuning can oftentimes be costly both in terms of wafers and lost production time. The tuning process itself can often be inexact with adjustments determined manually and often in a univariate (one-by-one or a-few-by-one) fashion.

In one embodiment, the tuning process can be improved by utilizing multivariate R2R control along with VM (as necessary) to more precisely determine tuning recommendations and reduce tuning iteration steps. A multivariate analysis is based on a statistical principle of multivariate statistics in which observation and analysis of more than one statistical outcome variable occurs at a time.

Figure 3:
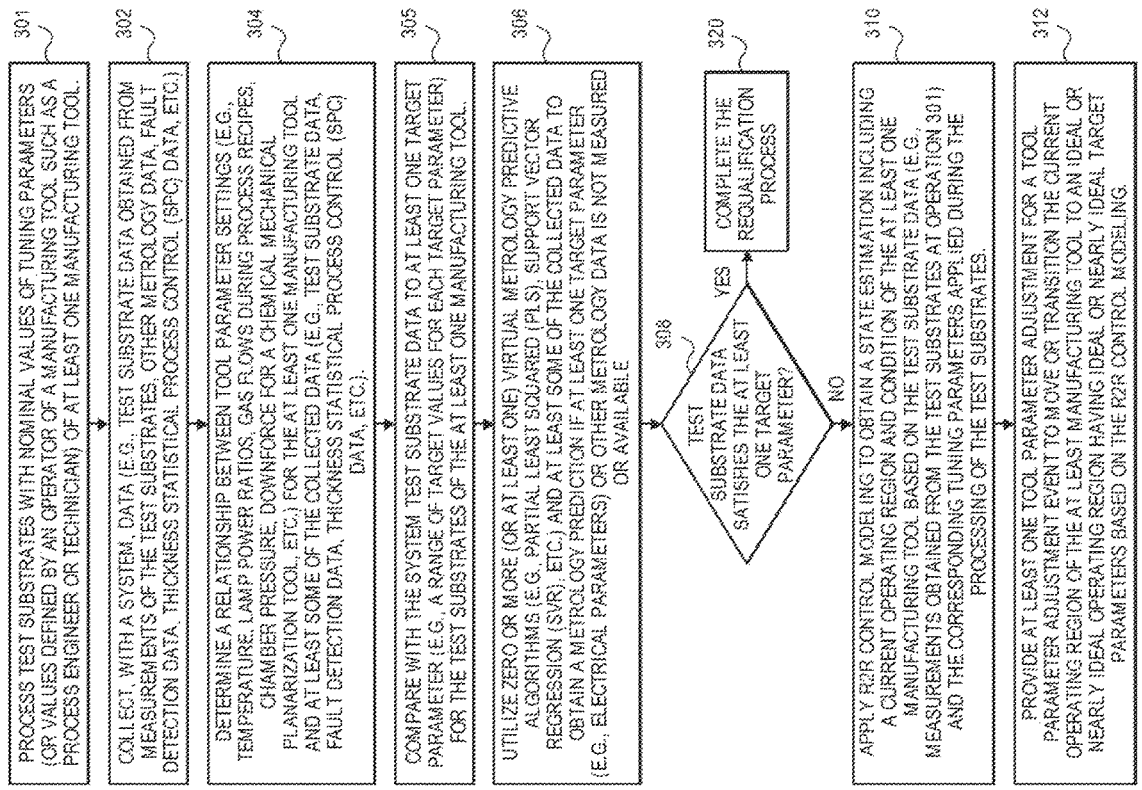
FIG. 3 illustrates a flow diagram of one embodiment for a computer implemented method of multivariate analysis utilizing run-to-run control and virtual metrology to reduce MTTR and improve G2G time during post preventative maintenance (PM) recovery.

FIG. 3 illustrates a flow diagram of one embodiment for a computer implemented method of multivariate analysis utilizing run-to-run control and virtual metrology to reduce MTTR and improve G2G time during post preventative maintenance (PM) recovery. The method may be performed by processing logic that may comprise hardware (e.g., circuitry, dedicated logic, programmable logic, microcode, etc.), software (such as instructions run on a processing device), or a combination thereof. In one embodiment, a computer implemented method 300 is performed by the equipment engineering system 105 or some other system (e.g., a system hosting a VM multi-algorithm prediction subsystem 107, R2R controller, and coupled to the EES 105 via a network). The computer implemented method 300 is designed to transition a manufacturing tool to an ideal or nearly ideal operating region after PM (or any maintenance) with some constraints. The ideal or nearly ideal operating region is defined by key parameters (e.g., thickness profile, electrical properties, etc.). Constraints may include tuning parameters (e.g., gas flows, temperature) that have certain boundaries and possible relationships with other tuning parameters or variables in order for the tool to be qualified for a production state. The tool is transitioned to the production state typically using multiple iterations of test substrates and adjusting tuning parameters.

Referring to FIG. 3, the computer implemented method 300 includes processing test substrates with nominal values of tuning parameters (or values defined by an operator of a manufacturing tool such as a process engineer or technician) of at least one manufacturing tool at operation 301. The computer implemented method 300 includes collecting data (e.g., test substrate data obtained from measurements of the test substrates, other metrology data, fault detection data, thickness statistical process control (SPC) data, etc.) by a system (e.g., an equipment engineering system) at operation 302. The collected data includes data associated with a manufacturing process, the at least one manufacturing tool and/or a manufactured product. Processing logic of the system determines a relationship between tool parameter settings (e.g., temperature, lamp power ratios, gas flows during process recipes, chamber pressure, downforce for a chemical mechanical planarization tool, etc.) for the at least one manufacturing tool and the collected data (e.g., test substrate data, other metrology data, fault detection data, thickness statistical process control (SPC) data, etc.) at operation 304. Processing logic then compares test substrate data to at least one target parameter (e.g., a range of target values for each target parameter) for the test substrates of the at least one manufacturing tool at operation 305. If at least one target parameter (e.g., electrical parameters) or metrology data is not measured or available, then processing logic of the system utilizes zero or more (or at least one) virtual metrology predictive algorithms (e.g., Partial Least Squared (PLS), Support Vector Regression (SVR), etc.) and at least some of the collected data to obtain a metrology prediction for the at least one target parameter or metrology data that is not measured or available at operation 306.

Processing logic of the system determines whether the test substrate data satisfies the at least one target parameter (e.g., within a range of target values for each target parameter) at operation 308. If so, then the processing logic completes the requalification process at operation 320.

Otherwise, processing logic then applies R2R control modeling (e.g., linear, nonlinear) to obtain a state estimation including a current operating region and condition of the at least one manufacturing tool based on the test substrate data (e.g., measurements obtained from the test substrates at operation 301) and the corresponding tuning parameters applied during the processing of the test substrates at operation 310. The processing logic of the system provides recommended tool parameter adjustments of a tool parameter adjustment event to move or transition the current operating region of the at least manufacturing tool to an ideal or nearly ideal operating region having ideal or nearly ideal target parameters based on the R2R control modeling at operation 312. A virtual metrology predictive algorithm if virtual metrology is necessary is tuned prior to or during its use in a tool parameter adjustment event of the tool parameter adjustments The method proceeds to operation 301 for a next iteration with the recommended (or similar) tool parameter adjustments having at least one different tuning parameter than the initial iteration at operation 301. In this manner, the method 300 reduces a tool or component downtime after PM or unplanned maintenance during maintenance recovery and requalification which results in higher product output. Thus, better utilization of manufacturing tools increases profits for the manufacturing environment.

Figure 4A:
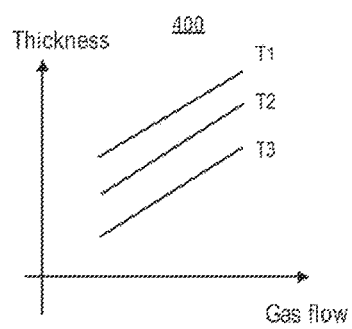
FIG. 4A illustrates a plot 400 of thickness versus gas flow for different temperatures of a deposition tool in accordance with one embodiment.
Figure 4B:
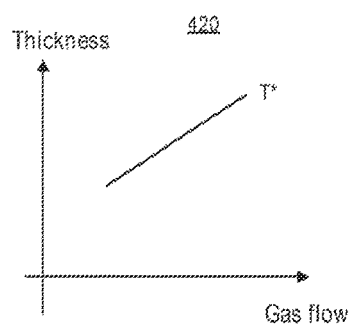
FIG. 4B illustrates a plot 420 of thickness versus gas flow for a specific temperature T* of a deposition tool at post PM in accordance with one embodiment.
Figure 4C:
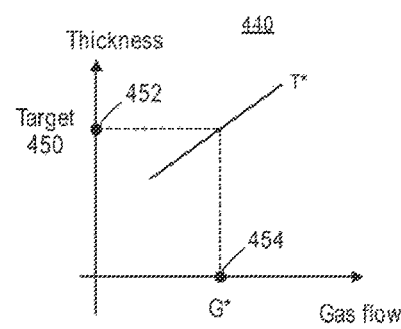
FIG. 4C illustrates a plot 440 of thickness versus gas flow for a temperature T* of a deposition tool in accordance with one embodiment, and finding the recommended gas flow for a desired thickness target.

In another example, the method 300 does not include utilizing one or more virtual metrology predictive algorithms to obtain a metrology prediction for the at least one target parameter that is not measured or available at operation 306. FIGS. 4A-4C illustrate one implementation of the method 300 for a deposition tool in accordance with one embodiment. FIG. 4A illustrates a plot 400 of thickness versus gas flow for different temperatures of a deposition tool in accordance with one embodiment. The different temperatures includes T1, T2, and T3. R2R control modeling uses this plot 400 to determine a current operating region and condition of the deposition tool based on the test substrate data (e.g., thickness measurements obtained from the test substrates, operation 301) illustrated in FIG. 4A and the corresponding tuning parameters (e.g., temperature, gas flow) applied during the processing of the test substrates. If test substrate data is not available, then VM can be used for predicting metrology data. The R2R control modeling models this plot 400 with the following equation:

$$\begin{bmatrix} y_{Central\ Thickness} \\ y_{Ge\ \%} \end{bmatrix} = \begin{bmatrix} f_{1(x_{GeH4}, x_{DCS}, x_{HCl}, x_{B2H6})} \\ f_{2(x_{GeH4}, x_{DCS}, x_{HCl}, x_{B2H6})} \end{bmatrix}$$

FIG. 4B illustrates a plot 420 of thickness versus gas flow for a temperature T* of a deposition tool in accordance with one embodiment. R2R control modeling obtains a state estimation including a current operating region and condition of the deposition tool as illustrated in plot 420. The R2R control model estimate state for the deposition tool with the following equation:

$$\begin{bmatrix} y_{Central\ Thickness} \\ y_{Ge\ \%} \end{bmatrix} = \begin{bmatrix} f_1^*(x_{GeH4}, x_{DCS}, x_{HCl}, x_{B2H6}) \\ f_2^*(x_{GeH4}, x_{DCS}, x_{HCl}, x_{B2H6}) \end{bmatrix}$$

FIG. 4C illustrates a plot 440 of thickness versus gas flow for a temperature T* of a deposition tool for modeling predictive control in accordance with one embodiment. This plot 440 includes a target 450 having a target central thickness 452 and a target gas flow 454 (e.g., target Ge dopant % for set of gas flows). R2R control modeling provides recommended tool parameter adjustments to move or transition the current operating region of the deposition tool to an ideal or nearly ideal operating region having ideal or nearly ideal target parameters based on the R2R control modeling. The R2R control modeling models the ideal or nearly ideal operating region for the deposition tool with the following equation:

$$\begin{bmatrix} x_{GeH4} \\ x_{DCS} \\ x_{HCl} \\ x_{B2H6} \end{bmatrix} =$$

$$\min_{x_{GeH4}, x_{DCS}, x_{HCl}, x_{B2H6}} \left\{ \begin{array}{l} |y_{CentralThickness}^{Target} - f_1^*(x_{GeH4}, x_{DCS}, x_{HCl}, x_{B2H6})| \\ |y_{Ge\%}^{Target} - f_1^*(x_{GeH4}, x_{DCS}, x_{HCl}, x_{B2H6})| \end{array} \right\}$$

For one example in semiconductor manufacturing, a R2R control maintenance recovery approach can be applied to a thermal process, where the lamp maintenance effort can be costly and time consuming.

Figure 5A:
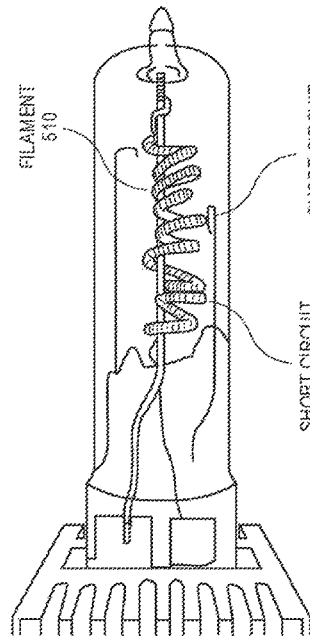
FIG. 5A illustrates lamp failure modes in accordance with one embodiment.

FIG. 5A illustrates lamp failure modes in accordance with one embodiment. In a typical system, lamps can fail unexpectedly causing unscheduled downtime and scrap. The lamp failure modes include a filament 410 that is sagging below a center line, a short circuit 412 between filament helix and support pillar, and a short circuit 414 between turns. The maintenance recovery can be time consuming as there are usually multiple post-maintenance (i.e., after lamp kit replacement) iterations of lamp parameter "tuning" that include running a number of test wafers with specific characterization recipes, analyzing metrology data, and making hardware and software adjustments. This process continues until the metrology data meets specified quality criteria. Four to ten iterations of this type are not uncommon leading to MTTR on the order of 2 days or more.

Figure 5B:
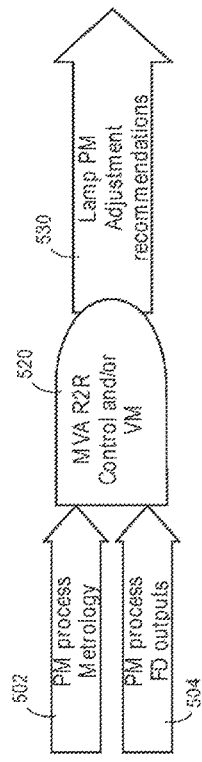
FIG. 5B illustrates a diagram in which multivariate R2R control with VM is applied in accordance with one embodiment.

FIG. 5B illustrates a diagram in which multivariate R2R control with VM is applied in accordance with one embodiment. PM process metrology 502 is utilized along with VM models based on FD output data 504 to determine a state of the system. PM tuning models utilize this state information to determine tuning advices in a multivariate fashion. The result is that fewer tuning iterations are required to bring the chamber to a satisfactory matched state for release back into production.

Figure 6:
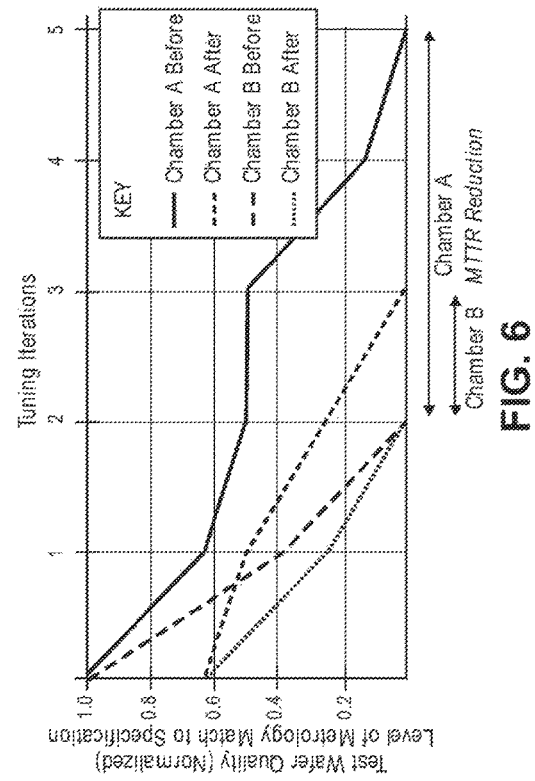
FIG. 6 illustrates a diagram in which multivariate R2R and VM models are applied during maintenance recovery in accordance with one embodiment.

FIG. 6 illustrates a diagram in which multivariate R2R and VM models are applied during maintenance recovery in accordance with one embodiment. In one example, more than one tuning iteration is usually required because the R2R control tuning model often has to be re-centered with the first set of metrology results. This is due to the variability in and length of time between PMs. Note also that VM information used to enhance the determination of a system state has been shown to provide an improved R2R control system capability. However, depending on the maintenance event type and tuning procedures, it may not always be necessary (i.e., PM process metrology may be sufficient). The diagram 600 illustrates test wafer quality (normalized) on a vertical axis versus tuning iterations for chambers A and B on a horizontal axis. For chamber A with no R2R control and VM, 5 iterations were need for maintenance recovery. For chamber A with R2R control and VM, only 2 iterations were need for maintenance recovery. Thus, the R2R control and VM during the maintenance recovery reduces the MTTR by 3 iterations.

For chamber B with no R2R control and VM, 3 iterations were need for maintenance recovery. For chamber B with R2R control and VM, only 2 iterations were need for maintenance recovery. Thus, the R2R control and VM during the maintenance recovery reduces the MTTR by 1 iteration.

In one example of a thin film deposition PM (e.g., CVD PM, epitaxial PM, etc.), a recovery period typically takes at least five tuning iterations for testing processing recipes with test substrates, performing metrology (e.g., measuring thickness profiles, determining dopant concentrations, etc.) for multiple recipes, and then making tuning adjustments for returning a film deposition tool to a production state. This causes PM recovery time period of greater than 3 days in which the deposition tool cannot be used in the production state for producing product.

Figure 7:
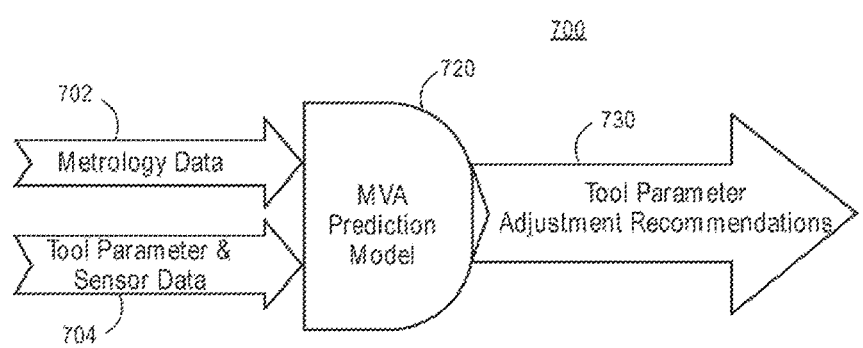
FIG. 7 illustrates a diagram in which multivariate R2R control with VM is applied in accordance with one embodiment.

FIG. 7 illustrates a diagram in which multivariate R2R control with VM is applied in accordance with one embodiment. Process metrology data 702 (e.g., SPC data, test substrate data, FD data, film thickness SPC data, etc.) and tool parameter and sensor data for at least one manufacturing tool are received as inputs for a multivariate prediction model 720 to determine state information of at least one system, equipment, or manufacturing tool. Process tuning models of the MVA prediction model utilize this state information to determine tuning advices in a multivariate fashion. The result is that fewer tuning iterations are required to bring the system or tool to a satisfactory state for release back into a production state.

In one example of MTTR modeling, a system collects historical test substrate data (e.g., FD data, film thickness SPC data, etc.). The system then determines a relationship between tool parameters settings and SPC data that corresponds to the tool parameter settings. Multivariate models are then utilized to rapidly identify critical parameters of the manufacturing tool to be adjusted or tuned. The models can identify values for multivariate variables or parameters that are out of tool or process specifications and then make appropriate corrections. In this manner, a downtime (i.e., non-production state) of the manufacturing tool is significantly reduced resulting in additional product output. For example, a number of tuning iterations can be reduced from at least 5 to 2 or 3 tuning iterations.

Figure 8:
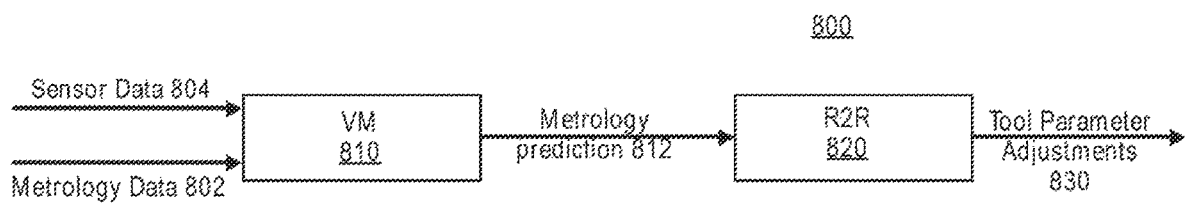
FIG. 8 illustrates a diagram in which multivariate R2R control with VM is applied in accordance with one embodiment.

FIG. 8 illustrates a diagram in which multivariate R2R control with VM is applied in accordance with one embodiment for reducing maintenance recovery time. Process metrology data 802 (e.g., SPC data, test substrate data, FD data, film thickness SPC data, etc.) and tool parameter and sensor data 804 for at least one manufacturing tool are received as inputs for at least one of the VM module 810 and the run-to-run control module 820. The VM module 810 utilizes at least one prediction algorithm for a virtual metrology function which can be a linear or nonlinear function F ($u_k$) with $u_k$ being sensor data (e.g., temperature, lamp power, lamp power ratios, gas flows for processing gases during a processing recipe, etc.) for at least one manufacturing tool at time k. The linear or nonlinear function F ($u_k$) generates a metrology prediction 812 based on at least the sensor data 804. The metrology prediction 812 may also be based on metrology data 802. The R2R controller 820 receives the metrology prediction 812 and determines tool parameter adjustments 830 based on the metrology prediction and R2R parameters including sensor data, a state $x_k$ at time k (e.g., a state of the manufacturing tool at time k such as), a state $x_{k+1}$ at time k+1 (e.g., a state of the manufacturing tool at time k+1), sensor noise $w_k$, metrology measurement noise $v_k$, metrology measurement $y_k$ at time k, a state transition function f(*), and observation function g(*).

In one embodiment, the R2R controller 820 utilizes the following equations for generating tool parameter adjustments 830:

$$x_{k+1} = f(X_k, u_k, w_k)$$

$$y_k = g(x_k) + v_k$$

Improved knowledge of a state $X_{k+1}$ at time k+1 (e.g., a state of the manufacturing tool at time k+1) and identification of critical parameters leads to a reduced number of tuning iterations for tool parameters adjustments 830. The manufacturing tool can be returned to a production state in a shorter time period with reduced maintenance recovery and requalification.

In another embodiment, the R2R controller 820 does not need the metrology prediction 812 for determining tool parameter adjustments 830.

In this manner, the R2R controller 820 utilizes this state information to determine tuning advices in a multivariate fashion.

In one example, the VM module 810 and R2R controller 820 are utilized to make adjustments to tool parameters based on a first set of input parameters (e.g., 3-5 input parameters). After the adjustments are made to tool parameters (e.g., process recipes) then the VM module 810 and R2R controller 820 are again utilized to make adjustments to tool parameters based on a different second set of input parameters (e.g., 3-5 input parameters).

Figure 9:
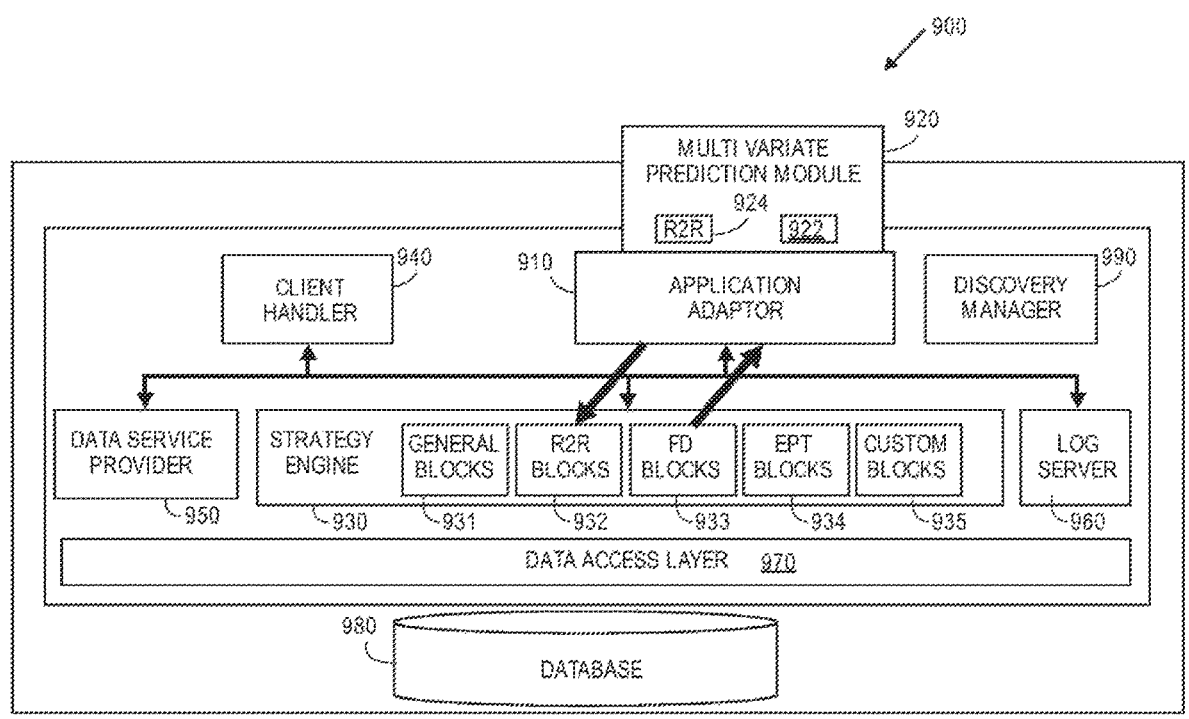
FIG. 9 illustrates an exemplary architecture of a system (e.g., an equipment engineering system (EES)), in accordance with one embodiment.

FIG. 9 illustrates an exemplary architecture of a system (e.g., equipment engineering system (EES)), in accordance with one embodiment. In one embodiment, the system 900 is implemented with an Applied E3™ APC Infrastructure in which methods of the present disclosure are integrated. The EES 900 leverages an E3 application adapter 610 that provides an interface to Web services. Multivariate prediction module 920 can be integrated through Web services. This multivariate prediction module 920 integration approach enables rapid prototyping, customization, and technology transfer. The multivariate prediction module 920 includes a predictive VM module 922 that enables the EES 900 to utilize and determine predictive algorithms for adaptive virtual metrology and also R2R control module 924 for reducing tuning iterations for post maintenance recovery.

The adapter 910 communicates with the strategy engine 930, the client handler 940, the data service provider 950, and the log server 960. The strategy engine 930 includes general blocks 931, run to run blocks 932 (e.g., R2R controller, R2R module), FD blocks 933, EPT blocks 934, and custom blocks 935. The FD blocks 933 obtain FD data. The run to run blocks 932 include pre-configured or adaptive R2R models for implemented operations of methods and embodiments of the present disclosure. The EPT blocks 934 obtain equipment performance tracking information. The data access layer 970 provides access to a database 980. This database 980 includes process data, FDC/EPT/R2R data, control rules, and data collection plans. The discovery manager 990 provides discovery features for identifying capabilities integrated into the system. The strategy engine is used to govern the interaction of blocks in terms of "strategies" to achieve specific objectives in response to events received.

For example, for substrate-to-substrate control (e.g., Wafer-to-Wafer (W2W) Control), a strategy housed by the strategy engine 930 could be envisioned that captures FD outputs from a FD implementation formulated with the FD blocks 933 and stored in the database 980, sends this information to a formulation in the multivariate prediction module 920 (integrated via the web-services adaptor 910) for calculation of VM outputs (e.g., metrology predictions), determination of tool parameter adjustments using R2R 924 (or alternatively R2R 932), and output this tool parameter adjustments for reducing tuning iterations after PM and during requalification state. Collected metrology data is used to update VM models.

There are a number of extensions to prediction algorithms that utilize feedback of actual output measurement data, such as metrology or yield analysis, to continually improve or "tune" the prediction models. As an example, NIPALS and EWMA (Exponentially Weighted Moving Average) are two documented adaptive extensions to the Project on Latent Structure prediction mechanisms. In one embodiment of this invention, the VM algorithms are tuned as necessary at the start of an MTTR event to account for changes in process, equipment or other conditions between downtimes that require an adjustment of the VM model. The type and level of adjustment can be determined by techniques such as a VM switching algorithm. These various extensions for handling the dynamics perform differently depending on the prediction and adaptation environment. Further many of the extensions also represent a tradeoff between computational complexity or time, and accuracy.

VM models include a predictive algorithm having a VM prediction equation:

$$S=B*t+c$$

In some embodiments, S is a predicted output, B represents a matrix, t is an input factor, and c is zero'th order term. S, B, t, and c are components vectors or matrices. Given two prediction adaptation algorithms EWMA and NIPALS, EWMA is fast and easy, but can be inaccurate when the VM equation changes. The EWMA can utilize zero'th order adaptation of the VM equation (e.g., updates the "c" vector). NIPALS is complex, but more accurate. NIPALS reformulates the VM equation (e.g., updates both "B" and "c"). The VM multi-algorithm prediction subsystem 107 may compare predictions of metrology data (Y') to actual metrology data (Y) on occasion with this difference being E.

FIG. 10 illustrates a diagrammatic representation of a machine in the exemplary form of a computer system 1000 in accordance with one embodiment within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1018 (e.g., a data storage device), which communicate with each other via a bus 1030.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets.

Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The secondary memory 1018 may include a machine-readable storage medium (or more specifically a computer-readable storage medium) 1031 on which is stored one or more sets of instructions (e.g., software 1022) embodying any one or more of the methodologies or functions described herein. The software 1022 may also reside, completely or at least partially, within the main memory 1004 and/or within the processing device 1002 during execution thereof by the computer system 1000, the main memory 1004 and the processing device 1002 also constituting machine-readable storage media. The software 1022 may further be transmitted or received over a network 1020 via the network interface device 1008.

The machine-readable storage medium 1031 may also be used to store one or more subsystems of a yield management system (YMS) 1020, an equipment engineering system (EES) 105 and/or a manufacturing execution system (MES) 110 (as described with reference to FIG. 1), and/or a software library containing methods that call subsystems of a YMS, EES and/or MES. The machine-readable storage medium 1031 may further be used to store one or more additional components of a manufacturing information and control system (MICS), such as a decision support logic component, a real-time monitor, and/or an execution logic component. While the machine-readable storage medium 1031 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

In one embodiment, a computer system includes a memory to store one or more sets of instructions and a processor that is coupled to the memory. The processor is configured to execute instructions to collect data including test substrate data and fault detection data for maintenance recovery of at least one manufacturing tool in a manufacturing facility, determine a relationship between tool parameter settings for the at least one manufacturing tool and at least some collected data including the test substrate data. The method further includes utilizing zero or more virtual metrology predictive algorithms and at least some collected data to obtain a metrology prediction and applying multivariate run-to-run (R2R) control modeling to obtain a state estimation including a current operating region of the at least one manufacturing tool based on the test substrate data and obtain at least one tool parameter adjustment for at least one target parameter for the at least one manufacturing tool. In one example, the R2R control modeling utilizes the following parameters: sensor data obtained from a sensor of the at least manufacturing tool, state at time k, state at time k+1, sensor noise, metrology measurement noise, metrology measurement at time k, a state transition matrix, a process sensitivity matrix, and an observation model matrix.

In one example, the virtual metrology predictive algorithm is tuned prior to or during its use in a tool parameter adjustment event of the at least one tool parameter adjustment. In one embodiment, the collected data includes a thickness profile and a dopant concentration for maintenance recovery of a deposition tool. The tool parameter adjustments include adjusting a temperature parameter, lamp power ratios, and gas flow parameters for the deposition tool.

In one example, applying multivariate run-to-run (R2R) control modeling to obtain tool parameter adjustments for the at least one manufacturing tool occurs after maintenance to reduce maintenance recovery time and to reduce requalification time.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method for controlling a semiconductor processing tool comprising:
    placing the semiconductor processing tool in a qualification state to qualify the semiconductor processing tool for production after a maintenance event, the qualification comprising:
        calculating a target state of the semiconductor processing tool;
        setting a tool parameter of the semiconductor processing tool;
        processing a substrate;
        collecting substrate processing data comprising processing data from the processing of the substrate, and a virtual metrology parameter derived from the processing data;
        predicting a metrology parameter of a second substrate based on the processing data and historical substrate processing data;
        correlating the virtual metrology parameter to the target state;
        providing an indicator that the virtual metrology parameter is outside of the target state;
        calculating a tool parameter adjustment based on the virtual metrology parameter and the indicator;
        modifying the tool parameter based on the tool parameter adjustment; and
        removing the semiconductor processing tool from the qualification state.

2. The method of claim 1 further comprising calculating a predicted value of a second substrate processing data based on virtual metrology data and the tool parameter adjustment.

3. The method of claim 2 further comprising calculating a second tool parameter adjustment based on the predicted value; and modifying the tool parameter with the second tool parameter adjustment.

4. A non-transitory computer-readable medium comprising instructions that, when executed by a processor of a processing system, cause the processing system to perform a method controlling a semiconductor processing tool, the instructions comprising:

place the semiconductor processing tool in a qualification state to qualify the semiconductor processing tool for production after a maintenance event, the qualification comprising:

calculate a target state of the semiconductor processing tool;

set a tool parameter of the semiconductor processing tool;

process a substrate;

collect substrate processing data comprising processing data from the processing of the substrate, and a virtual metrology parameter derived from the processing data;

correlate the virtual metrology parameter to the target state;

provide an indicator that the virtual metrology parameter is outside of the target state;

calculate a tool parameter adjustment based on the virtual metrology parameter and the indicator;

remove the tool parameter based on the tool parameter adjustment; and remove the semiconductor processing tool from the-qualification state.

5. The non-transitory computer-readable medium of claim 4 further comprising calculating a predicted value of a second substrate processing data based on virtual metrology data and the tool parameter adjustment.

6. The non-transitory computer-readable medium of claim 5 further comprising calculating a second tool parameter adjustment based on the predicted value; and modifying the tool parameter with the second tool parameter adjustment.

7. A processing system, comprising:

a memory comprising computer-executable instructions;

a processor configured to execute the computer-executable instructions and cause the processing system to perform a method for controlling a semiconductor processing tool, the instructions comprising:

place the semiconductor processing tool in a qualification state to qualify the semiconductor processing tool for production after a maintenance event, the qualification comprising:

calculate a target state of the semiconductor processing tool;

set a tool parameter of the semiconductor processing tool;

process a substrate;

collect substrate processing data comprising processing data from the processing of the substrate, and a virtual metrology parameter derived from the processing data;

correlate the virtual metrology parameter to the target state;

provide an indicator that the virtual metrology parameter is outside of the target state;

calculate a tool parameter adjustment based on the virtual metrology parameter and the indicator;

remove the tool parameter based on the tool parameter adjustment; and remove the semiconductor processing tool from the-qualification state.

8. The processing system of claim 7 further comprising calculating a predicted value of a second substrate processing data based on virtual metrology data and the tool parameter adjustment.

9. The processing system of claim 8 further comprising calculating a second tool parameter adjustment based on the predicted value; and modifying the tool parameter with the second tool parameter adjustment.

* * * * *